(12) United States Patent
Sarmah

(10) Patent No.: US 8,238,452 B1
(45) Date of Patent: Aug. 7, 2012

(54) CIRCUIT FOR SYNCHRONIZING SERIAL COMMUNICATION CHANNELS

(75) Inventor: Mrinal J. Sarmah, Guwahati (IN)

(73) Assignee: Xilinx, Inc., San Jose, CA (US)

( * ) Notice: Subject to any disclaimer, the term of this patent is extended or adjusted under 35 U.S.C. 154(b) by 746 days.

(21) Appl. No.: 12/367,011

(22) Filed: Feb. 6, 2009

(51) Int. Cl.
*H04L 27/00* (2006.01)
(52) U.S. Cl. ....................................................... 375/259
(58) Field of Classification Search ............... 370/395.5; 375/259, 356; 713/400
See application file for complete search history.

(56) References Cited

U.S. PATENT DOCUMENTS

| | | | |
|---|---|---|---|
| 2005/0078683 A1* | 4/2005 | Page | 370/395.5 |
| 2008/0288805 A1* | 11/2008 | Osborn et al. | 713/400 |

OTHER PUBLICATIONS

Athavale, A., and Christensen, C., "High Speed Serial I/O Made Simple", A Designers' Guide with FPGA Applications, Connectivity Solutions, Edition 1.0, Apr. 2005, 210 pages.

* cited by examiner

*Primary Examiner* — Leon-Viet Nguyen
(74) *Attorney, Agent, or Firm* — LeRoy D. Maunu

(57) ABSTRACT

Circuits are provided for synchronizing serial communication channels having respective receivers, of which one is a master receiver. Each receiver includes a FIFO buffer and a synchronizing element. The FIFO buffer is written periodically with characters received from the serial communication channel of the receiver, and the FIFO buffer is read periodically, except between the start and end of synchronization of the receiver. The start of synchronization of the master receiver is generated from the timing of reading a channel bonding character from the FIFO buffer of the master receiver. The start of synchronization of each receiver other than the master receiver is generated after the start of the master receiver and in response to reading a channel bonding character from the FIFO buffer of the receiver. The end of synchronization of the receivers is generated a time interval after the start of the master receiver.

20 Claims, 4 Drawing Sheets

CIRCUIT FOR SYNCHRONIZING SERIAL COMMUNICATION CHANNELS

FIELD OF THE INVENTION

The present invention generally relates to data communication, and more particularly to synchronizing data received in parallel from multiple serial communication channels.

BACKGROUND

Serial communication channels can achieve high data rates and a parallel combination of multiple serial communication channels can achieve even higher data rates. Physical media dependent differences between the serial communication channels can relatively skew the received data between the various serial communication channels.

The receivers should compensate for this skew to decode the received data properly. Circuits to compensate for this skew are difficult and time consuming to implement. In addition, there is a general need to develop skew compensation circuits for various target application that reduce the amount of circuits and/or area for implementing the skew compensation circuit.

The present invention may address one or more of the above issues.

SUMMARY

Various embodiments of the invention provide circuits for performing synchronization of serial communication channels. There are respective receivers for the serial communication channels, and one of these receivers may be designated a master receiver. Each receiver may include a deserializer, a comparator, a delay element, a FIFO buffer, and a synchronizing circuit. The deserializer may produce a stream of characters from serial data received from the serial communication channel for the receiver. The comparator may generate a flag for each character in the stream, and the flag may be asserted when the character is a channel bonding character. The delay element may delay each character in the stream relative to the flag for the character. The FIFO buffer may be periodically written, including writing to the FIFO buffer each character delayed by the delay element and the flag from the comparator, and the FIFO buffer may be periodically read, except between a start and an end of the synchronization of the receiver. The synchronizing circuits may be coupled together. The synchronizing circuit of the master receiver may generate the start of the synchronization of the master receiver in response to reading the flag that is asserted from the FIFO buffer of the master receiver. The synchronizing circuit of each receiver other than the master receiver may generate the start of the synchronization of the receiver after the start of the master receiver and in response to reading the flag that is asserted from the FIFO buffer of the receiver. The synchronizing circuit of the master receiver may generate the end of the synchronization of the receivers after the start of the master receiver.

Various other embodiments of the invention provide circuits for performing synchronization of serial communication channels. There are respective receivers for the serial communication channels, and one of these receivers is a master receiver. Each receiver includes a FIFO buffer and a synchronizing element. The FIFO buffer is written periodically, including writing to the FIFO buffer a stream of characters received from the serial communication channel of the receiver, and the FIFO buffer is read periodically, except between a start and an end of the synchronization of the receiver. The synchronizing elements of the receivers are coupled together. The start of the synchronization of the master receiver is generated in response to reading a channel bonding character from the FIFO buffer of the master receiver. The start of the synchronization of each receiver other than the master receiver is generated after the start of the master receiver and in response to reading a channel bonding character from the FIFO buffer of the receiver. The end of the synchronization of the receivers is generated a time interval after the start of the master receiver.

Yet another embodiment of the invention provides a circuit for performing synchronization of serial communication channels having respective receivers. The circuit includes a means for designating a master receiver. The circuit includes means for generating a start of the synchronization of the master receiver in response to detecting a channel bonding character from the serial communication channel for the master receiver. The circuit includes means for generating an end of the synchronization of the receivers after a time interval following the start of the synchronization of the master receiver. The circuit includes means for suspending periodic reads from a FIFO buffer for the master receiver. The periodic reads are suspended between the start of the synchronization of the master receiver and the end of the synchronization of the receivers. The circuit includes means for generating a delayed start for each of the receivers other than the master receiver. The delayed start is generated after the start of the synchronization of the master receiver and in response to detecting a channel bonding character from the serial communication channel for the receiver. The circuit includes means for suspending periodic reads from a FIFO buffer for each of the receivers other than the master receiver. The periodic reads are suspended between the delayed start for the receiver and the end of the synchronization of the receivers.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION OF THE DRAWINGS

Figure 1:
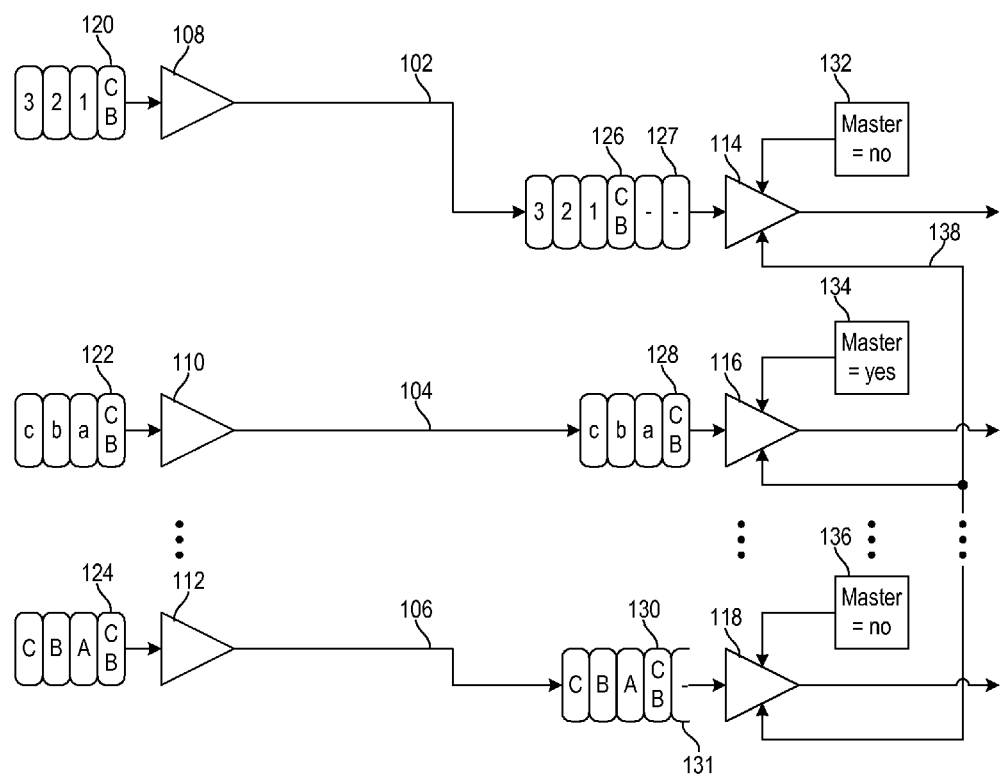
FIG. 1 is a data flow diagram of a system for synchronization of serial communication channels in accordance with various embodiments of the invention.

FIG. 1 is a data flow diagram of a system for synchronization of serial communication channels in accordance with various embodiments of the invention. The multiple serial communication channels are bonded together to produce an aggregate communication channel with a higher rate of data communication.

The serial communication channels on lines 102, 104, and 106 connect drivers 108, 110, and 112 to receivers 114, 116, and 118. In one embodiment, drivers 108, 110, and 112 periodically transmit respective channel bonding characters 120, 122, and 124. While the drivers 108, 110, and 112 transmit the channel bonding characters 120, 122, and 124 approximately simultaneously, the channel bonding characters 126, 128, and 130 may arrive unsynchronized at the receivers 114, 116, and 118 because the serial communication channels on lines 102, 104, and 106 have different propagation delays from, for example, differing lengths of the serial communication channels on lines 102, 104, and 106. Because serial communication channel 102 is longer than serial communication channel 104, receiver 114 receives character 127 coincident with receiver 116 receiving channel bonding character 128. Similarly, receiver 118 receives a portion of character 131 while receiver 116 receives character 128.

To correctly receive the data transmitted via the serial communication channels on lines 102, 104, and 106, the receivers 114, 116, and 118 compensate for the differing propagation delays. It will be appreciated that the receivers could also compensate for skewed transmission of data by drivers 108, 110, and 112.

In one embodiment, the receivers 114, 116, and 118 have respective configuration states 132, 134, and 136. Any one of the receivers 114, 116, and 118 can be configured to be the master receiver. In one example, configuration state 134 configures receiver 116 to be the master receiver because serial communication channel 104 has the shortest propagation delay, and configuration states 132 and 136 configure receiver 114 and 118 to be slave receivers. Configuration states 132, 134, and 136 provide means for designating the master receiver in one embodiment of the invention.

The master receiver 116 coordinates the synchronization of the receivers 114, 116, and 118 via a synchronization channel on line 138. In one embodiment, the receivers 114, 116, and 118 become synchronized when the next character output by receivers 114, 116, and 118 is the respective channel bonding characters 126, 128, and 130.

In one embodiment, the master receiver 116 asserts a synchronization signal on line 138 to begin synchronization of the receivers 114, 116, and 118, and the master receiver 116 deasserts the synchronization signal on line 138 to complete synchronization of the receivers 114, 116, and 118. The master receiver 116 asserts the synchronization signal on line 138 after receiving the channel bonding character 128 and before the master receiver 116 outputs the channel bonding character 128. The master receiver 116 suspends outputting characters temporarily during the synchronization process. When synchronization with the slaves 132 and 136 is complete, the master receiver deasserts the synchronization signal on line 138, and then the master receiver 116 resumes outputting characters starting with the channel bonding character 128.

The master receiver 116 asserts the synchronization signal on line 138 before the slave receiver 114 outputs the channel bonding character 126, and similarly before the slave receiver 118 outputs the channel bonding character 130. The master receiver 134 is the one of receivers 114, 116, and 118 connected to the communication channel 104 that has the minimum propagation delay. This helps ensure that the master receiver 116 asserts the synchronization signal on line 138 before slave receivers 114 and 118 output the channel bonding characters 126 and 130. Note that in some embodiments, for example if the maximum correctable skew is limited to not more than half of the period between channel bonding characters, the master receiver is not limited to the channel having the shortest propagation delay. After receiving the assertion of the synchronization signal on line 138, the slave receiver 114 continues outputting characters until the channel bonding characters 126 is the next character to be output. The slave receiver 118 similarly outputs characters until the channel bonding character 130 is next. The slave receivers 114 and 118 suspend outputting characters temporarily until the master receiver deasserts the synchronization signal on line 138, and then the slave receivers 114 and 118 resume outputting characters starting with the channel bonding characters 126 and 130.

In another embodiment, the synchronization channel on line 138 includes a master start signal and a synchronization end signal driven by the master receiver 116 to the slave receivers 114 and 118, and slave start signals driven by each of the slave receivers 114 and 118 to the master receiver 116. The master receiver 116 asserts the master start signal and suspends outputting characters upon receiving the channel bonding character 128. In response to the master receiver 116 asserting the master start signal, each of slave receivers 114 and 118 assert their slave start signal and suspend outputting characters upon receiving the respective channel bonding character 126 or 130. The master receiver 116 asserts the synchronization end signal upon receiving the synchronization start signal from all of the slave receivers 114 and 118. The synchronization end signal causes all of the receivers 114, 116, and 118 to resume outputting characters beginning with the respective channel bonding character 126, 128, or 130.

Figure 2:
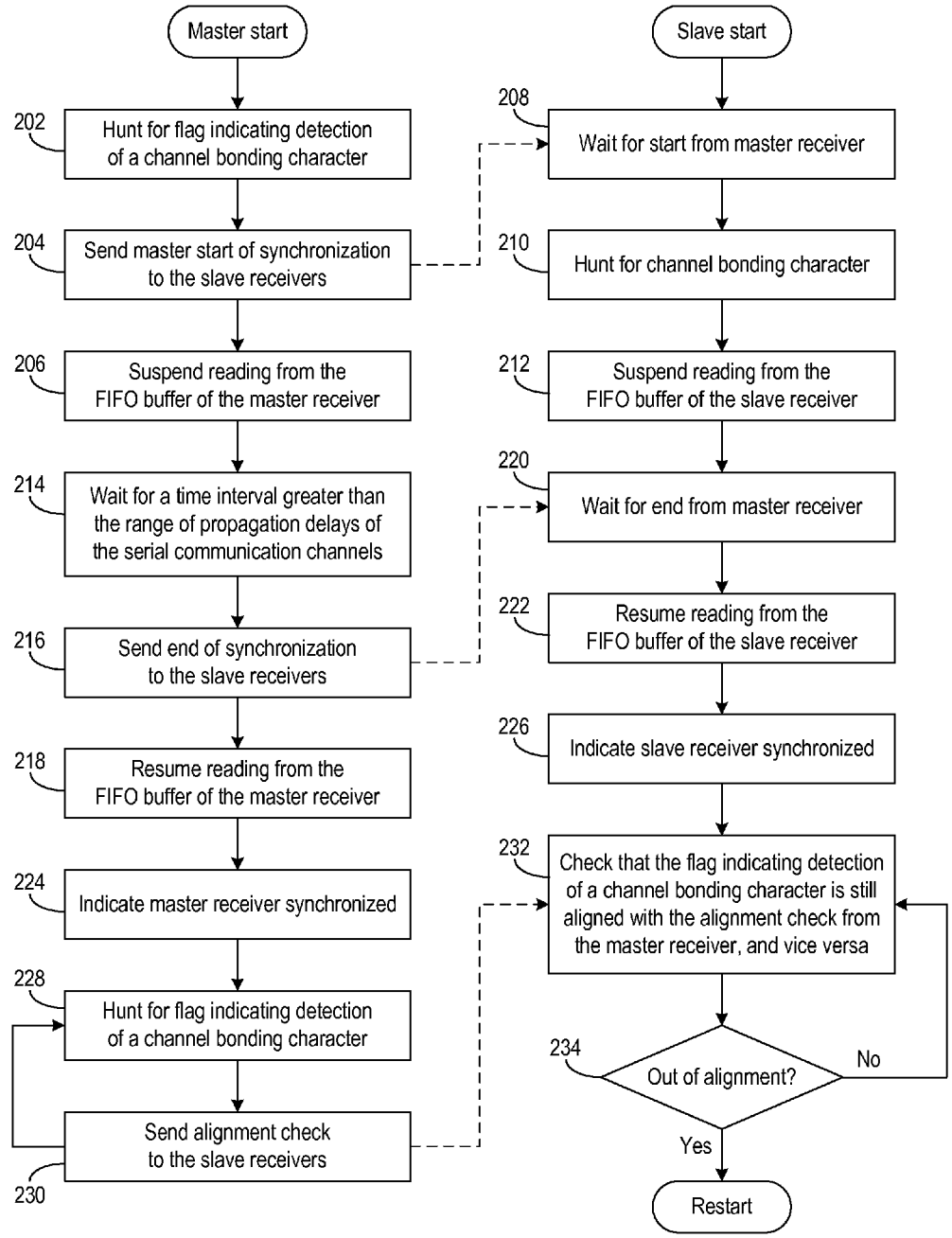
FIG. 2 is a flow diagram of parallel master and slave processes for synchronization of serial communication channels in accordance with various embodiments of the invention.

FIG. 2 is a flow diagram of parallel master and slave processes for synchronization of serial communication channels in accordance with various embodiments of the invention. The master receiver performs the master process shown on the left side of FIG. 2 and each of the slave receivers perform the slave process shown on the right side of FIG. 2.

At step 202, the master hunts for an indication of the receipt of a channel bonding character. Upon detecting a channel bonding character, the master sends a synchronization start to each of the slaves at step 204. At step 206, the master suspends reading and outputting characters from a FIFO buffer of the master.

Each slave waits for the synchronization start at step 208. At step 210, each slave hunts for an indication of the receipt of a channel bonding character. Upon detecting a channel bonding character, each slave suspends reading and outputting characters from a FIFO buffer of the slave at step 212.

At step 214, the master waits for a time interval greater than the extent of the range of expected propagation delays of the serial communication channel. In one embodiment, a printed circuit board connects the drivers of the serial communication channels to the receivers, and analysis of the printed circuit board yields the expected propagation delays. At step 216, the master sends the synchronization end to the slaves. At step 218, the master resumes reading characters from the FIFO buffer of the master.

Each slave waits for the synchronization end at step 220. At step 222, each slave resumes reading characters from the FIFO buffer of the slave. Because the slaves and the master all resume reading characters from respective FIFO buffers in response to the synchronization end generated by the master at step 216, the resumed reading of characters is synchronized between the master and slave receivers. In one embodiment, the first character each receiver reads out of the FIFO buffer is the channel bonding character detected at step 202 for the master and step 210 for each of the slaves.

The master indicates completed synchronization at step 224, and each slave indicates completed synchronization at step 226. With synchronization complete, the master and the slaves switch to verifying that synchronization has not been lost.

At step 228, the master hunts for an indication of the receipt of a channel bonding character. Upon detecting a channel bonding character, the master sends an alignment check to each of the slaves at step 230. At step 232, each slave checks for alignment between the alignment check and the local indication of the receipt of a channel bonding character. If a particular slave receives an alignment check from the master without the slave receiving a coinciding channel bonding character from the serial communication channel, or if the slave receives a channel bonding character without a coinciding alignment check, then synchronization is lost.

Decision 234 checks whether synchronization is lost when the alignment check and the received channel bonding character are out of alignment. For an alignment check coinciding with a received channel bonding character, alignment verification continues at step 232. If any one of the slaves detects a lost of synchronization, then the corresponding slave process restarts the master process and all of the slave processes.

Figure 3:
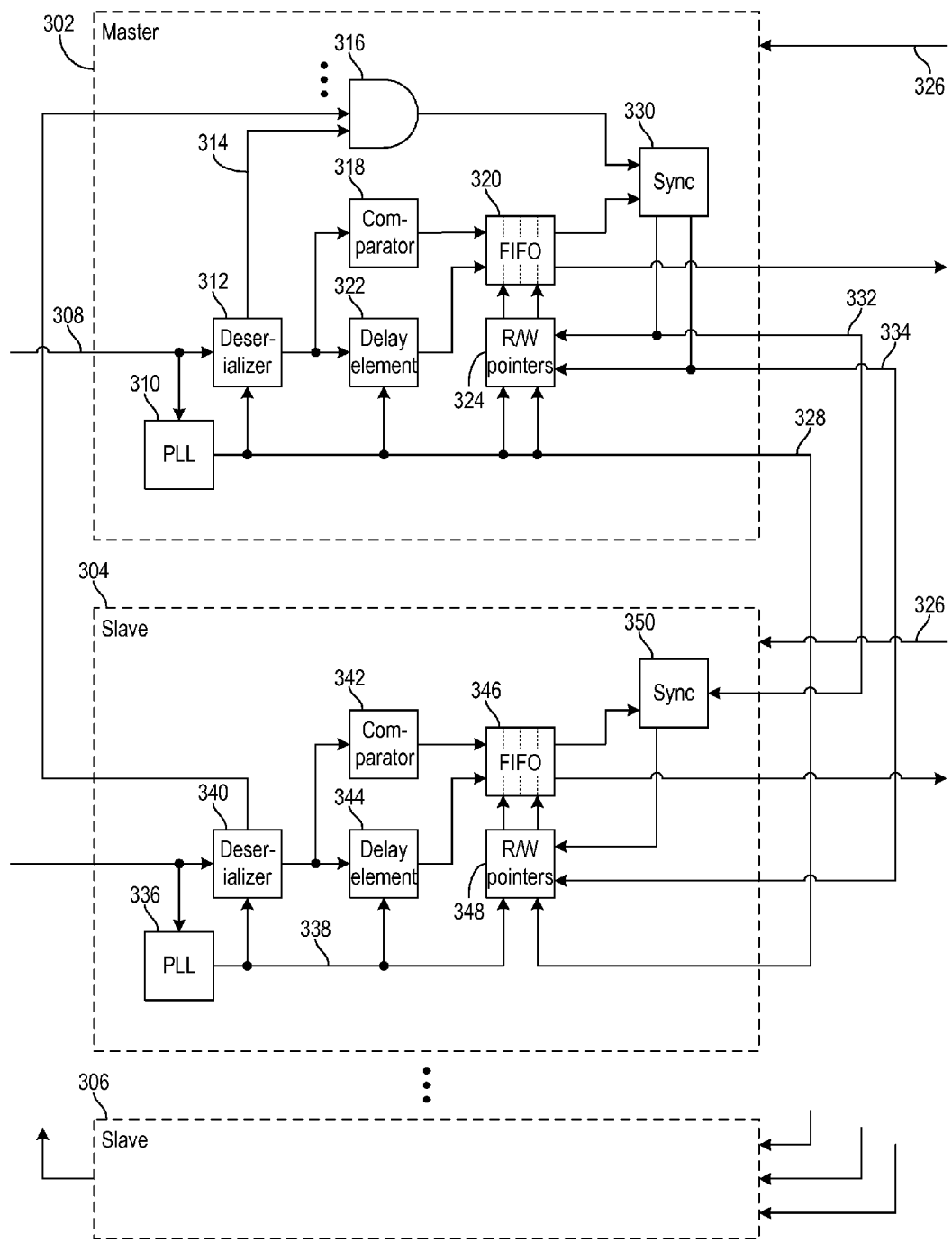
FIG. 3 is a block diagram of a master and slave circuits for synchronization of serial communication channels in accordance with various embodiments of the invention.

FIG. 3 is a block diagram of a master and slave circuits for synchronization of serial communication channels in accordance with various embodiments of the invention. The designated master receiver 302 coordinates the synchronization of the master and slave receivers 302, 304, and 306.

The master circuit 302 receives serial data on line 308, and phase-locked loop 310 recovers a master clock on line 328 from the serial data. Deserializer 312 extracts characters from the serial data received on line 308. To extract the characters from the serial data, deserializer 312 should determine the boundaries of the characters within the bits of the received serial data. Once deserializer 312 has determined the character boundaries, deserializer 312 asserts the lock signal on line 314. AND gate 316 receives similar lock signals from all of the master and slave receivers 302, 304, and 306, and AND gate 316 outputs an indication that all the deserializers are currently extracting characters.

Comparator 318 determines whether the current character from deserializer 312 is a channel bonding character. Comparator 318 generates a flag and sends the flag to FIFO buffer 320. Comparator 318 asserts the flag when the current character from deserializer 312 is a channel bonding character; otherwise, comparator 318 deasserts the flag.

The delay element 322 delays the characters from the deserializer 312 relative to the flag from comparator 318. With this delay, the flag effectively gives advance notice of the arrival of a channel bonding character at FIFO buffer 320. In one embodiment, the delay element 322 provides a fixed delay of two character periods of the master clock on line 328, and the flag consequently provides two characters of advance notice of the forthcoming channel bonding character. In another embodiment, the delay element 322 provides a delay that is a selectable number of character periods of the master clock on line 328.

The FIFO buffer 320 writes characters received from delay element 322 and flags received from comparator 318. The FIFO buffer 320 writes each combination of a character and a flag to a location specified by a write pointer in pointers 324. The FIFO buffer 320 later outputs each combination from a location specified by a read pointer in pointers 324. The assertion of a reset signal on lines 326 initializes the read and write pointers 324 to a predetermined value. After deassertion of the reset signal on lines 326, the read and write pointers 324 are generally incremented for each character period of the master clock on line 328. Thus, combinations of characters and flags are periodically written to successive locations in FIFO buffer 320 selected by the write pointer, and combinations of characters and flags are periodically read from successive locations in FIFO buffer 320 selected by the read pointer. That is, the master clock on line 328, which may be recovered from the input serial data, may be used as a write clock signal and a read clock signal for FIFO buffer 320.

The flag read from FIFO buffer 320 gives the synchronizing circuit 330 advance notice that FIFO 320 will soon output a channel bonding character. If AND gate 316 indicates all deserializers are extracting characters, synchronizing circuit 330 generates a synchronization start on line 332 when the flag read from FIFO buffer 320 is asserted. In one embodiment, synchronizing circuit 330 generates a synchronization end on line 334 a time interval after generating the synchronization start. The time interval is greater than the difference between the longest and shortest propagation delays of the serial communication channels. This difference is the range of the propagation delays.

The synchronization start on line 332 temporarily suspends the incrementing of the read pointer in pointers 324. In one embodiment, the synchronization start on line 332 suspends the incrementing of the read pointer at the location of the channel bonding character in the FIFO buffer 320. The FIFO buffer 320 continues to accept characters and flags, but reading is suspended or reading is effectively suspended by repeatedly reading the channel bonding character from FIFO buffer 320.

After the synchronizing circuit 330 generates the synchronization end on line 334, the FIFO buffer 320 resumes outputting characters, beginning with the channel bonding character. During the synchronization between the synchronization start on line 332 and the synchronization end on line 334, the FIFO buffer 320 accepts characters, but does not output characters. Because of this, the FIFO buffer 320 should have enough storage locations to accumulate characters and flags received during the synchronization.

The example slave receiver 304 include a phase-lock loop 336 that extracts a slave clock on line 338 from the data received from the serial communication channel. Deserializer 340 extracts characters from the received serial data. Comparator 342 checks whether each character is a channel bonding character. Delay element 344 delays each character relative to the flag from comparator 342.

FIFO buffer 346 writes each character and predictive flag to a location specified by a write pointer in pointers 348. Because the write pointer is incremented for each character period of the slave clock on line 338, the FIFO buffer 346 writes the characters to successive locations.

FIFO buffer 346 reads each character and predictive flag from a location specified by a read pointer in pointers 348. The read pointer increments for each cycle of the master clock on line 328, unless the read pointer is being maintained during synchronization of the slave receiver 304. Thus, the local slave clock on line 338 is used as a write clock signal that controls writing characters and flags to FIFO 346, and the master clock on line 328 is used as a read clock signal that controls reading characters and flags from FIFO 346. Thus, all of the receivers share the master clock on line 328 as a read clock signal.

Frequently, the master and slave clocks have the same clock source, but are phase shifted because of the various propagation delays of the serial communication channels. The FIFO 346 transfers the data received by slave receiver 304 from the clock domain of the local slave clock to the clock domain of the master clock. Thus, the FIFO 346 bonds the master receiver 302 and the slave receiver 304 into the same clock domain. The bonding of the receivers 302, 304, and 306 also requires synchronization of the channel bonding characters.

The synchronization start on line 332 from master receiver 302 begins the synchronization of the example slave receiver 304. After receiving the synchronization start on line 332, slave receiver 304 continues reading characters from FIFO buffer 346 until the flag from FIFO buffer 346 indicates that a channel bonding character is forthcoming. When the flag from FIFO buffer 346 indicates channel bonding character is forthcoming, the synchronizing circuit 350 stops incrementing the read pointer in pointers 348 to suspend reading characters from the FIFO buffer 346. In one embodiment, reading suspends when the read pointer points to the location of the channel bonding character in the FIFO buffer 346. Reading of characters and flags from FIFO buffer 346 remains suspended until the master receiver 302 provides the synchronization end on line 334.

In one embodiment, after the master receiver 30 generates the synchronization end on line 334, the FIFO buffer 346 resumes outputting characters, beginning with the channel bonding character. The resumption of outputting characters is synchronized between FIFO buffer 320 of the master receiver 302 and FIFO buffer 346 of example slave receiver 304. Thus, the channel bonding characters are output from receivers 302, 304, and 306, and data following the channel bonding characters can be properly interpreted.

While the master receiver 302 and the example slave receiver 304 are shown in FIG. 3 with similar, but slightly different, circuitry, it will be appreciated that the receivers 302, 304, and 306 can be implemented with identical circuitry that is configurable to implement either a master receiver or a slave receiver.

It will also be appreciated that FIFO buffers 324 and 346 are implemented in certain embodiments using shift registers instead of the illustrated memory with read and write pointers.

Figure 4:
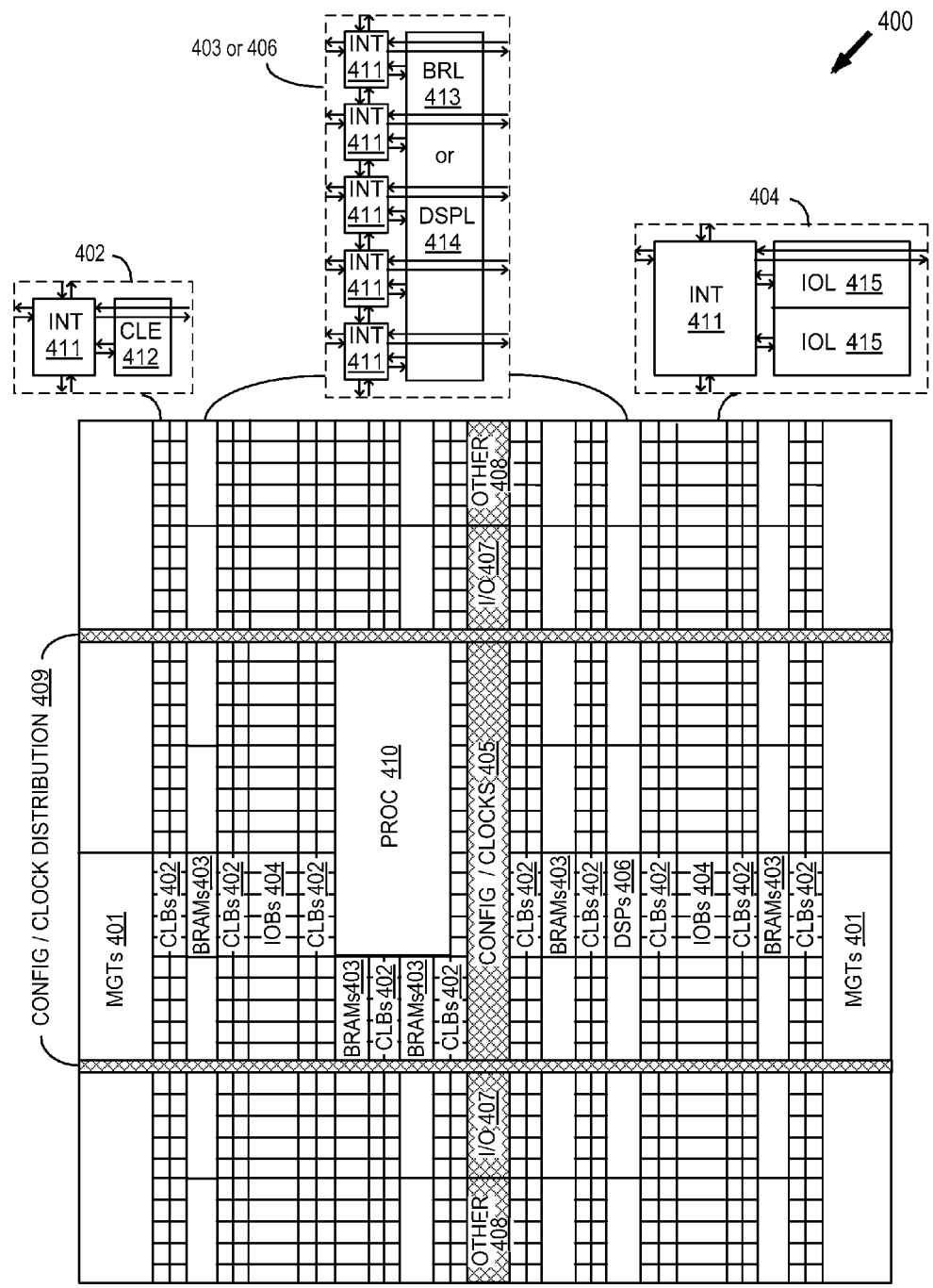
FIG. 4 is a block diagram of a programmable integrated circuit for implementing synchronization of serial communication channels in accordance with various embodiments of the invention.

FIG. 4 is a block diagram of a programmable integrated circuit for implementing synchronization of serial communication channels in accordance with various embodiments of the invention. The programmable integrated circuit includes multi-gigabit transceivers (MGTs 401) that each include a receiver, and two or more of these receivers can be bonded together to form a high bandwidth communication channel.

Advanced FPGAs can include several different types of programmable logic blocks in an array. For example, FIG. 4 illustrates an FPGA architecture 400 that includes a large number of different programmable tiles including dedicated multi-gigabit transceivers (MGTs 401), configurable logic blocks (CLBs 402), random access memory blocks (BRAMs 403), input/output blocks (IOBs 404), configuration and clocking logic (CONFIG/CLOCKS 405), digital signal processing blocks (DSPs 406), specialized input/output blocks (I/O 407) (e.g., configuration ports and clock ports), and other programmable logic 408 such as digital clock managers, analog-to-digital converters, system monitoring logic, and so forth. Some FPGAs also include dedicated processor blocks (PROC 410).

In some FPGAs, each programmable tile includes a programmable interconnect element (INT 411) having standardized connections to and from a corresponding interconnect element in each adjacent tile. Therefore, the programmable interconnect elements taken together implement the programmable interconnect structure for the illustrated FPGA. The programmable interconnect element (INT 411) also includes the connections to and from the programmable logic element within the same tile, as shown by the examples included at the top of FIG. 4.

For example, a CLB 402 can include a configurable logic element (CLE 412) that can be programmed to implement user logic plus a single programmable interconnect element (INT 411). In one example, the user logic is FIFO buffers and synchronizing circuits for channel bonding multiple MGTs 401 that each include a deserializer. A BRAM 403 can include a BRAM logic element (BRL 413) in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 406 can include a DSP logic element (DSPL 414) in addition to an appropriate number of programmable interconnect elements. An 10B 404 can include, for example, two instances of an input/output logic element (IOL 415) in addition to one instance of the programmable interconnect element (INT 411). As will be clear to those of skill in the art, the actual I/O pads connected, for example, to the I/O logic element 415 typically are not confined to the area of the input/output logic element 415.

In the pictured embodiment, a columnar area near the center of the die (shown shaded in FIG. 4) is used for configuration, clock, and other control logic. Horizontal areas 409 extending from this column are used to distribute the clocks and configuration signals across the breadth of the FPGA.

Some FPGAs utilizing the architecture illustrated in FIG. 4 include additional logic blocks that disrupt the regular columnar structure making up a large part of the FPGA. The additional logic blocks can be programmable blocks and/or dedicated logic. For example, the processor block PROC 410 shown in FIG. 4 spans several columns of CLBs and BRAMs.

Note that FIG. 4 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the top of FIG. 4 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

The present invention is thought to be applicable to a variety of systems for synchronizing serial communication channels. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A circuit for performing synchronization for a plurality of serial communication channels, comprising:
    a plurality of respective receivers for the serial communication channels, one of the receivers being a master receiver, wherein each of the respective receivers includes:
        a comparator configured to generate a flag for each character in a respective stream of characters received by the receiver, the flag being asserted in response to the character being a channel bonding character;
        a delay element configured to delay each character in the respective stream relative to the flag for the character;
        a FIFO buffer that is periodically written with each character delayed by the delay element and the flag from the comparator, wherein the FIFO buffer is periodically read except between a start and an end of the synchronization of the respective receiver; and a synchronizing element coupled to the FIFO buffer;

wherein the synchronizing elements of the respective receivers are coupled together, wherein the start of the synchronization of the master receiver is generated in response to reading a channel bonding character from the FIFO buffer of the master receiver, wherein the start of the synchronization of each respective receiver other than the master receiver is generated after the start of the synchronization of the master receiver and in response to reading a channel bonding character from the FIFO buffer of the respective receiver, and wherein the end of the synchronization of the respective receivers is generated a time interval after the start of the master receiver.

2. The circuit of claim 1, wherein the FIFO buffer of each of the respective receivers includes a plurality of storage locations and a reset input, and wherein during an assertion of the reset input, the FIFO buffer writes characters beginning at a first predetermined one of the storage locations and reads characters beginning at a second predetermined one of the storage locations.

3. The circuit of claim 1, wherein the FIFO buffer of each of the respective receivers has inputs for a write clock signal and a read clock signal, wherein the write clock signal is derived from serial data received from the serial communication channel for the respective receiver, and wherein the read clock signal for the FIFO buffer of all of the respective receivers is a shared clock signal.

4. The circuit of claim 1, wherein the FIFO buffer of each of the respective receivers includes a write pointer and a read pointer, wherein the write pointer is incremented as each character in the stream is written to the FIFO buffer, wherein the read pointer is incremented as each character in the stream is read from the FIFO buffer, and wherein the value of the read pointer is maintained during the synchronization of the respective receiver.

5. The circuit of claim 1, wherein the synchronizing element of the respective receivers are coupled together by a synchronizing signal asserted by the master receiver at the start of the synchronization of the master receiver and deasserted by the master receiver at the end of the synchronization of the respective receivers.

6. The circuit of claim 1, wherein the synchronizing element of the respective receivers are coupled together by a synchronizing signal, and wherein each of the respective receivers is selectable to be the master receiver that drives the synchronizing signal.

7. The circuit of claim 1, wherein the serial communication channels have respective propagation delays, and wherein the master receiver is selected to be the respective receiver of the serial communication channel which has a minimum value of the respective propagation delays.

8. The circuit of claim 1, wherein the serial communication channels have respective propagation delays, and wherein the time interval is selected in response to a range of the respective propagation delays.

9. A circuit for performing synchronization for a plurality of serial communication channels, comprising:

a plurality of respective receivers for the serial communication channels, one of the receivers being a master receiver, wherein each of the respective receivers includes:

a deserializer producing a stream of characters from serial data received from the serial communication channel for the respective receiver;

a comparator coupled to the deserializer, the comparator generating a flag for each character in the stream, the flag being asserted in response to the character being a channel bonding character;

a delay element coupled to the deserializer, the delay element delaying each character in the stream relative to the flag for the character;

a FIFO buffer coupled to the comparator and the delay element, wherein the FIFO buffer is periodically written, including writing to the FIFO buffer each character delayed by the delay element and the flag from the comparator, and the FIFO buffer is periodically read except between a start and an end of the synchronization of the respective receiver; and a synchronizing circuit coupled to the FIFO buffer;

wherein the synchronizing circuit of the respective receivers are coupled together, wherein the synchronizing circuit of the master receiver generates the start of the synchronization of the master receiver in response to reading the flag that is asserted from the FIFO buffer of the master receiver, wherein the synchronizing circuit of each respective receiver other than the master receiver generates the start of the synchronization of the respective receiver after the start of the master receiver and in response to reading the flag that is asserted from the FIFO buffer of the respective receiver, and wherein the synchronizing circuit of the master receiver generates the end of the synchronization of the respective receivers after the start of the synchronization of the master receiver.

10. The circuit of claim 9, wherein any one of the respective receivers is selectable to be the master receiver.

11. The circuit of claim 9, wherein the serial communication channels have respective propagation delays, and wherein the master receiver is selected to be the respective receiver of the serial communication channel which has a minimum value of the respective propagation delays.

12. The circuit of claim 9, wherein the deserializer of each of the respective receivers asserts a lock signal that indicates the deserializer is aligned and successfully producing the stream of characters from the serial data, and wherein the synchronizing circuit of the master receiver generates the start of the synchronization of the master receiver in response to the lock signal being asserted by the deserializer of all of the respective receivers.

13. The circuit of claim 9, wherein the deserializer of the respective receivers comprises dedicated logic of a programmable integrated circuit, and wherein the synchronizing circuit comprises at least a portion of an array of resources of the programmable integrated circuit, the resources including programmable logic resources and programmable interconnect resources.

14. The circuit of claim 9, wherein the delay element delays the characters in the stream relative to the flag by a selectable number of clock cycles, and wherein the number of the clock cycles is selected to prevent reading the channel bonding character from the FIFO buffer of all of the respective receivers during the synchronization of the respective receivers.

15. The circuit of claim 9, wherein the FIFO buffer of each of the respective receivers includes a read pointer, wherein the FIFO buffer outputs the character and the flag that are stored in a location in the FIFO buffer corresponding to a value of the read pointer, and wherein the start signal of the respective receiver is generated in response to the FIFO buffer outputting the flag that is asserted.

16. The circuit of claim 9, wherein the synchronizing circuit of the master receiver generates the end of the synchronization of the respective receivers a time interval after the start of the master receiver.

17. The circuit of claim 16, wherein the serial communication channels have respective propagation delays, and wherein the time interval is selected in response to a range of the respective propagation delays.

18. The circuit of claim 9, wherein the synchronizing circuit of the master receiver generates the end of the synchronization of the respective receivers in response to the start of all of the respective receivers.

19. The circuit of claim 9, wherein after the synchronization of the respective receivers, the synchronizing circuit of the master receiver generates an alignment check in response to reading the flag that is asserted from the FIFO buffer of the master receiver, and wherein in response to the alignment check, the synchronizing circuit of each respective receiver other than the master receiver verifies proper assertion of the flag from the FIFO buffer of the respective receiver.

20. A circuit for performing synchronization for a plurality of serial communication channels, comprising:

means for designating a master one of a plurality of respective receivers for the serial communication channels;

means, in each of the receivers, for comparing each character in a respective stream of characters received by the receiver and for generating a flag for each received character, the flag being asserted in response to the character being a channel bonding character;

means, in each of the receivers, for delaying each character in the respective stream relative to the flag for the character;

means, in each of the receivers, for storing each flag output from the means for generating the flag and for storing each character output from the delay means in a FIFO buffer of the receiver;

means for generating a start of the synchronization of the master receiver in response to detecting an asserted flag in the FIFO buffer of the master receiver;

means for generating an end of the synchronization of the respective receivers after a time interval following the start of the synchronization of the master receiver;

means for suspending periodic reads from the FIFO buffer for the master receiver, wherein the periodic reads are suspended between the start of the synchronization of the master receiver and the end of the synchronization of the respective receivers;

means for generating a delayed start for each of the respective receivers other than the master receiver, wherein the delayed start is generated after the start of the synchronization of the master receiver in response to detecting a channel bonding character from the serial communication channel for the respective receiver; and means for suspending periodic reads from the FIFO buffer for each of the respective receivers other than the master receiver, wherein the periodic reads are suspended between the delayed start for the respective receiver and the end of the synchronization of the respective receivers.

* * * * *